Feb. 16, 1965 G. E. LEWIS 3,169,551
PULSATION DAMPENER

Filed Aug. 8, 1961 5 Sheets-Sheet 1

GEORGE E. LEWIS,
INVENTOR.

BY Barkelew + Lewis

Feb. 16, 1965

G. E. LEWIS 3,169,551

PULSATION DAMPENER

Filed Aug. 8, 1961

GEORGE E. LEWIS,
INVENTOR.

BY
Barkelew & Lewis

United States Patent Office 3,169,551
Patented Feb. 16, 1965

3,169,551
PULSATION DAMPENER
George E. Lewis, Arcadia, Calif., assignor to Hydril Company, Los Angeles, Calif., a corporation of Ohio
Filed Aug. 8, 1961, Ser. No. 131,711
12 Claims. (Cl. 138—26)

This invention has to do with the damping of pulsations in columns of flowing fluid. The present application is a continuation in part of my copending application Serial No. 726,941, filed on April 7, 1958, now abandoned, under the same title.

A body of fluid, whether gas or liquid, which is enclosed within an elongated chamber, such, for example as a pipe through which the fluid is delivered from one place to another, is ordinarily an excellent conductor of pulsations. Pulsations may be produced in such a fluid column by vibratory action of many different kinds. For example, a section of the fluid chamber may be subjected to bodily movement transmitted mechanically from nearby machinery or the like. As a further example, particularly troublesome pulsations are often produced by direct cyclic action upon the fluid body, as by pumps employed to move the fluid or to compress it. Unimpeded transmission of such pulsations along a fluid column may cause serious difficulties, such as undesired noise, mechanical vibration of machinery and fittings to which the pipe is connected, and even fatigue and fracture of structural elements or of the pipe itself. Many different types of pulsation dampening devices have been developed in an effort to bring such difficulties under control.

An important object of the present invention is to provide improved mechanism for dampening pulsations in a column of fluid. More particularly, the invention provides structures capable of eliminating a larger fraction of the initial pulsation amplitude than was previously possible. The structures of the present invention are particularly simple and economical, and their high effectiveness in action is combined with remarkable economy and convenience in both construction and maintenance.

A common type of pulsation dampener comprises a damping chamber which is connected to the fluid column to be damped. The damping chamber is at least partially filled with a resiliently compressible medium. That medium may, for example, comprise a body of compressible gas at a pressure corresponding to the average pressure of the fluid in the pulsating column. The damping chamber may be provided with a movable wall which separates the compressible medium from the fluid of the column. Such a movable wall may comprise a piston, for example, or may comprise a diaphragm structure of flexible material such as rubber or the like. Particularly when the movable wall is of piston type, the compressible medium may comprise one or more mechanical springs or weights. For some types of service it is unnecessary to provide a physical separation between the compressible medium and the fluid of the pulsating column. For example, if that fluid is a liquid, the compressible medium may comprise a suitable gas filling the upper portion of the damping chamber above the surface of the liquid. When the fluid of the pulsating column is a gas, it is often convenient to utilize that same gas as the compressible medium, the entire contents of the damping chamber than being compressible. For clarity of description, the invention will be described in part with reference to a damping chamber that includes a flexibly yielding wall backed by compressible gas, but it is to be understood that many features of the invention do not require the presence of such a wall.

With a damping chamber of the described type connected to the fluid column, a pressure wave moving along the latter tends to cause a net movement of fluid intermittently in and out of the damping chamber in response to pressure variations in the column. The resulting variations in volume of fluid in the damping chamber are accommodated by flexing of the movable wall and corresponding compression of the gas behind it. Such action causes limited reduction of the amplitude of a pressure wave in the fluid column. When the damping chamber is connected to the fluid column by means of a T-connection the resulting damping is usually severely limited by inertia of the fluid in the connecting line between fluid column and damping chamber.

The effective impedance of the connecting line is sometimes reduced by connecting the damping chamber directly in series with the fluid column to be damped. For example, the chamber may be of elongated, generally cylindrical form, with fluid entrance near one end and fluid exit near the other end. The fluid entrance is then connected, for example, to the portion of the fluid column in which the pulsations originate, and the fluid exit is connected to the portion of the fluid column which it is desired to protect from those pulsations. In some known structures of that type substantially the entire cylindrical wall of the chamber is flexible. It is found, however, that even with such an arrangement an appreciable fraction of the initial pulsation is transmitted through such damping structures from one portion of the fluid column to the other.

The present invention provides greatly improved effectiveness of damping by arranging the inlet and outlet passages of the damping chamber so that there is direct physical interaction between fluid entering the damping chamber from one portion of the fluid column and fluid flowing out of that chamber to the other portion of the fluid column. That may be accomplished, for example, by providing passage structure which conducts the inlet and outlet fluid streams in substantially opposite directions and along distinct paths that are in direct fluid contact with each other at an interface of appreciable area. At that interface, the pressure and velocity characteristics of one stream are thereby enabled to affect directly the pressure and velocity characteristics of the other stream. In accordance with the present invention, interaction of that type is utilized to improve the effectiveness of the dampening action. The present aspect of the invention makes practicable for the first time the substantially complete elimination of pulsations in fluid columns.

In previously available devices of the described type only partial elimination of pulsations was possible. Absorption by the chamber of the fluid volume associated with an incoming compression wave, for example, required compression of the compressible medium in the chamber, and yielding of the flexible chamber wall, if present. The associated increase in the chamber pressure was directly transmitted as an outgoing pulsation to the fluid column, setting a lower limit to the fraction of the initial pulsation that remained unabsorbed. Since in damping chambers of practicable size that fraction differs appreciably from zero, complete elimination of pulsations by previous damping chambers was impossible. Attempts have been made to improve the damping by resonating devices of various sorts, but such devices tend to be complex and expensive. Whereas they may sometimes be helpful for pulsations having a definite fixed frequency, they tend to reduce the effectiveness of the damping at other frequencies, and therefore do not provide a satisfactory solution of the present problem.

When a damping chamber is connected in series with a fluid colum in such a way that fluid entering the chamber from one portion of the column directly interacts with fluid passing out of the chamber to the other portion of the column in the manner already indicated, the degree of damping obtainable is no longer limited by the relations just described. Instead, it becomes possible for the first time to obtain greatly increased absorption of pulsations over a wide range of frequencies. Moreover, by overcoming the limitations of previous systems, the invention makes possible a high degree of damping with relatively small and economical equipment.

The invention further provides particularly effective, economical and efficient structures for damping pulsations in a flowing stream of fluid in the described manner. An outstanding advantage of those structures is that highly effective damping can be obtained while permitting substantially unrestricted flow of fluid along a fluid delivery pipe.

A more particular feature of the invention is the discovery that effective interaction can be obtained between fluid stream flowing into and out of a damping chamber by means of orifices that are mutually spaced longitudinally of the stream direction. The stream defining orifices may, for example, be formed in alignment in respective opposedly spaced walls, leading to a particularly efficient and economical structure that is especially well suited for handling large amounts of fluid flow.

A full understanding of the invention and of its further objects and advantages will be had from the following description of certain illustrative embodiments, of which the accompanying drawings form a part. Those embodiments are only for illustration, and their particulars are not intended as a limitation upon the scope of the invention.

Figure 1:
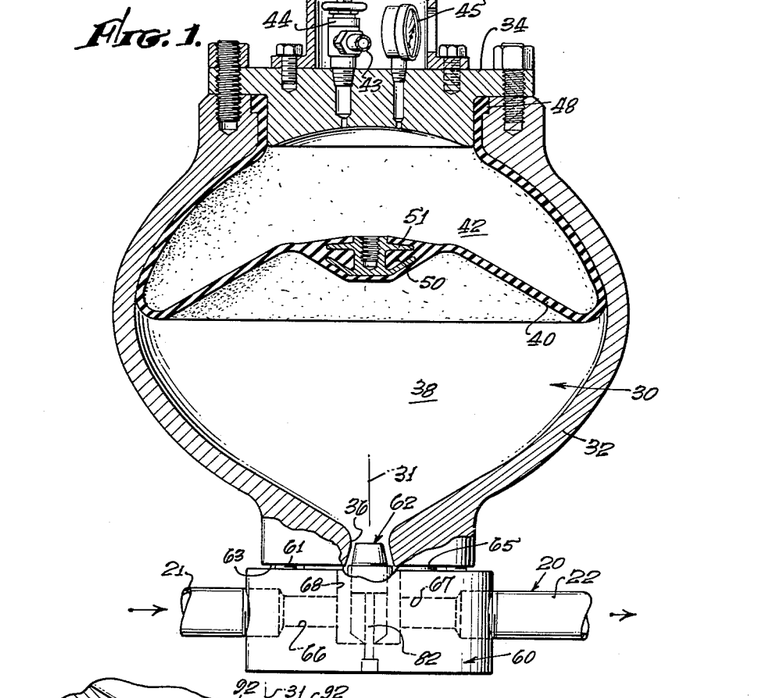
FIG. 1 is a vertical axial section representing an illustrative damping chamber with movable wall in accordance with the invention.
Figure 2:
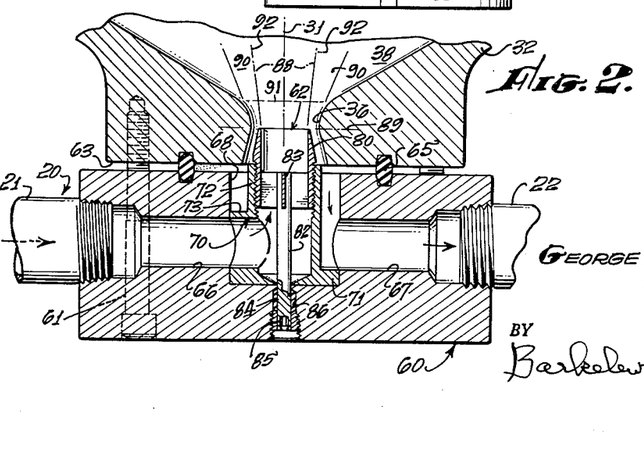
FIG. 2 is a fragmentary section corresponding to a portion of FIG. 1 at enlarged scale.

In the embodiment of FIGS. 1 and 2, a fluid column is typically represented at 20, and comprises two portions, indicated at 21 and 22, respectively. Pulsations typically originate in one of those portions of column 20, and it is desired to prevent the transmission of such pulsations to the other portion of the column. For definiteness, the pulsation source may be considered to be in column portion 21, and net fluid flow may be considered to take place from column portion 21 to portion 22, as indicated by the arrows. Whereas that represents the preferred orientation of the device, it has been found that effective damping action is also obtainable with the reverse direction of the pulsations or of the fluid flow or both.

A damping chamber 30 is formed by the housing body 32 and the cover member 34. Chamber 30 is symmetrical about an axis, indicated at 31, and is of generally spherical form. For purposes of description, axis 31 will be considered vertical, and that orientation of the structure is generally preferred, although not necessary to the invention. Chamber 30 is divided by a movable wall 40 into a lower fluid chamber 38 and an upper resilient chamber 42 which is filled with a compressible medium. That medium is typically a gas such as air, which may be supplied to chamber 42 at any desired pressure via the gas line 43 and valve 44. A pressure gauge 45 is preferably mounted on cover 34 and indicates the gas pressure existing within the chamber. Movable wall 40 typically comprises a diaphragm of flexible material such as rubber, for example, which is preferably molded in a bladder-like form and conforms generally to the shape of chamber 30 when fully distended. The rim portion 48 of the diaphragm is clamped in sealed relation between housing 32 and cover 34. The central portion 50 of diaphragm 40 is preferably thickened and may be reinforced by a metal insert, shown typically at 51. Communication between the lower end of chamber 30 and fluid column 20 is provided via the axial aperture 36 in the chamber wall and via conduit structure to be further described. The chamber and diaphragm structure just described which is frequently used as an accumulator, is particularly well adapted for the present purpose.

The lower portion 38 of damping chamber 30 is connected in series between the two portions 21 and 22 of fluid column 20. That is, substantially distinct fluid paths are provided to those respective portions of the column. In the present embodiment those paths are defined by conduit structure comprising the coupling member 60, the jet nozzle 62, which is axially mounted on member 60, and the wall of aperture 36.

Coupling member 60 is mounted, as by the bolts 61, on the flat lower face 63 of chamber housing 32, suitable sealing means being provided as indicated at 65. A horizontal through bore is formed in member 60. The opposite end portions 66 and 67 of that bore are adapted, as by counterboring and threading, for connection to the respective portions 21 and 22 of the fluid column to be damped. Member 60 is provided with a vertical bore 68 which is coaxial with chamber axis 31 and communicates axially with aperture 36 in the chamber housing and radially with bores 66 and 67. A fitting 70 is fixedly mounted in bore 68, as by welding. Fitting 70 integrally comprises a base portion 71, a vertical sleeve portion 72, extending coaxially upwardly from base 71 in spaced relation within bore 8, and a horizontal sleeve portion 73. The bore of sleeve 73 communicates at one end with that of sleeve 72 via a side aperture in the latter, and at the other end with conduit bore 66, with which it is aligned.

A nozzle member 80 is adjustably mounted on sleeve portion 72 and forms an upward extension of that sleeve. As shown, sleeve portion 72 is internally threaded and carries the externally threaded nozzle member 80, the vertical position of which is variable in response to rotation. Manual adjustment of the axial position of nozzle 80 is provided by the control rod 82, the upper end of which is fixedly mounted coaxially on the nozzle as by the radial struts 83. The lower portion of rod 82 is rotatably received in an axial bore 86 in coupling member 60. Leakage around rod 82 is prevented by suitable sealing means, shown as the packing 84 and the packing retaining sleeve 85, which is threaded in bore 86 and is rotatable to compress the packing. The lower end of rod 82 is provided, like retainer 85, with a suitable fitting to receive an adjusting tool. Nozzle member 80, together with the described fitting 70, forms the nozzle 62, already referred to.

If adjustment of the conduit structure is not required, nozzle member 80 may be formed integrally with sleeve portion 72 of fitting 70, rod 82, bore 86, packing 84 and retainer 85 being then omitted.

The described structure directs flow between fluid column portion 21 and damping chamber 30 along an axial stream path, indicated schematically at 88; and directs flow between fluid column portion 22 and the damping chamber along a stream path of generally annular form, indicated schematically at 90. Flow path 88 includes the generally cylindrical volume within nozzle 62 and within the upward axial projection of the nozzle wall, which is represented schematically in FIG. 2 by the lines 92. Flow path 90 includes the annular volume bounded inwardly by the wall of nozzle 62 and its upward projection 92, and bounded outwardly by the aligned walls of bore 68 and of aperture 36 in the chamber wall. Below the plane of the nozzle orifice, indicated at 89, those two flow paths are physically separated by the nozzle wall. Above that plane the two flow paths are not separated by any physical partition, but are in direct fluid contact with each other. However, for an appreciable distance along the direction of flow above plane 89 the two paths remain clearly distinct. That direct contiguous relation between the two fluid streams may be produced by a wide variety of detailed structure, of which the present arrangement is illustrative. In general, it has been found that the improvement in the damping action varies in a controllable manner with the dimensions of the effective interface between the contiguous portions of the two streams and with the sharpness of definition of the two streams adjacent that interface.

In general, flow may proceed into chamber 30 along either of the flow paths 88 or 90, and out of chamber 30 along the other path. In many actual fluid columns in which damping of pulsations is required, there is ordinarily an appreciable net flow in one direction or the other. For example, when the pulsations to be damped arise in one portion of the column from one or more pumps which pressurize the fluid, there is typically flow along the column away from the pumps. With structure of the present type, the damping chamber is preferably connected so that such net flow is from column portion 21 to portion 22. Axial flow path 88 then functions as inlet into chamber 30 and flow path 90 functions as outlet. However, effective damping is also obtainable with the opposite connection. The structure is therefore useful in situations in which net flow may take place in either direction; and it is also useful when there is little or no net flow, and the primary flow in and out of chamber 38 comprises the intermittent flow associated with the pulsations to be damped.

For any given values of the charge of gas in upper chamber 42 and of the fluid pressure communicated to lower chamber 38 from fluid column 20, diaphragm 40 typically adjusts by flexure to an intermediate position, such as that of FIG. 1 for example, at which the gas charge is compressed to a pressure in equilibrium with that of the fluid column, taking account of any pressure drop due to flow through the orifice structure. Any gradual change in the column pressure then typically produces a new equilibrium position of the diaphragm. The same is true of more rapid pressure changes in column 20, subject, however, to factors limiting or otherwise controlling the rate of fluid flow between the fluid column and the damping chamber.

For clarity of description, and without intending any limitation upon the scope of the invention, it will be supposed for illustration that the fluid in column 20 flows at appreciable velocity from 21 to 22, so that a fluid jet emerges from nozzle 62 upward into chamber 38 along path 88. On the average, an equal amount of fluid leaves the chamber via path 90. It will also be supposed that pulsations originate in column portion 21 and are transmitted through the fluid along the column and up through nozzle 62. Such pulsations then cause momentary or periodic variations in the pressure and flow rate of stream 88, which variations are typically small compared to the average flow rate.

Under such illustrative conditions the generally cylindrical boundary 92 between the incoming stream 88 and the outgoing stream 90 just within chamber 38 corresponds to the boundary layer of fluid at which the average axial velocity is zero. Fluid on one side of that boundary belongs to the inlet stream, that on the other side to the contiguous outlet stream. The exact limits of each stream depend in part upon the behavior of the other stream. Moreover, conditions such as pressure and velocity within each stream are affected by the similar conditions within the other stream.

More particularly, the incoming stream exerts a viscous drag upon the outgoing stream, which is in a direction to oppose flow of the latter, and which tends to increase with the velocity of the incoming stream. Also, an increase in the velocity of the incoming stream tends to reduce the static pressure in its neighborhood. It is believed that both of those types of interaction between the two streams contribute to the damping action by causing the velocity of outflow from the damping chamber to vary inversely with the velocity of inflow.

Such interaction tends to increase with the average velocity of each stream. For any given mass flow along the fluid column to be damped, the velocity of flow of the inlet and outlet streams adjacent their interface varies inversely with the stream cross section, and is therefore readily controllable during design of the equipment. It is ordinarily desirable to increase the relative stream velocities by restricting the cross section of one or both of them in the region in which they are contiguous. Such restriction of outlet stream 90, for example, is produced in the present embodiment by the "venturi" form of the walls of aperture 36, producing minimum cross section closely adjacent orifice plane 89. In FIG. 2 the radius of the restricted passage 36 at orifice plane 89 is approximately 1.4 times the radius of the nozzle 62. The cross-sectional area of the nozzle is therefore approximately equal to that of the annular outlet passage formed between the nozzle and the wall of aperture 36. Hence, in the present embodiment the velocity of flow is approximately equal in the inlet and outlet streams where they are contiguous adjacent the nozzle tip. The sharpness of the venturi action is increased by its location closely adjacent the mouth portion 91 of aperture 36, where that aperture opens into the body of chamber 38.

With conduit structure of given configuration, the effectiveness of interaction between the two fluid streams has been found to be conveniently adjustable by varying the axial position of the stream interface with respect to such a venturi structure. Illustrative mechanism for effecting such adjustment has already been described, comprising the threaded mounting of nozzle sleeve 80 and control rod 82. When a rigid assembly is preferred, corresponding adjustment may be obtained by providing interchangeable parts of suitably selected dimensions. With the particular structure shown in FIG. 2, for example, the inlet and outlet streams display maximum interaction available for damping when the plane 89 of the nozzle orifice is positioned axially approximately as shown, that is, somewhat below the narrowest part of aperture 36; and such interaction tends to decrease progressively as the nozzle lip is withdrawn farther into aperture 36, or is advanced across the mouth portion 91 of that aperture and into the body of chamber 38. Whereas optimum performance under given operating conditions may depend rather sharply upon such adjustment of the conduit structure of the dampening mechanism, it is emphasized that over a wide range of such adjustment the observed performance is typically notably superior to that of previously available mechanisms.

With apparatus of the described type, the amplitude of pulsations in a fluid column can typically be reduced to a few percent of the initial value. The residual pulsations are sometimes found to substantially disappear when the conduit structure of the pulsation dampener is adjusted for less than maximum effective interaction between the two fluid streams, and to increase when the stream interaction is increased from that value. That condition is particularly desirable, since it indicates optimum performance of the equipment.

Although the utility of the invention does not depend upon any particular theory of operation, the observed phenomenon just mentioned can perhaps be understood in the following way. An incident pulsation traveling along fluid column 21 causes a momentary increase of the velocity of inlet stream 88. The resulting accumulation of fluid in chamber 38 deflects diaphragm 40 upward, compressing the gas in upper chamber 42 and increasing the pressure in the entire damping chamber. In previously available pulsation dampeners, that pressure increase tended to produce an outgoing pulsation in the downstream portion of the fluid column.

The present invention may be viewed as compensating the described momentary pressure increase within the damping chamber. That is, the increase in velocity of the outlet stream that would normally result from such pressure increase is largely or wholly prevented from taking place. The increased inlet velocity may be viewed as causing a decrease in outlet velocity, due to the described interaction of the two streams at their common interface. And that decrease in outlet velocity compensates or substantially cancels out the expected increase.

In accordance with that view, it is possible for the stream interaction to be more effective than is required, producing over-compensation and perhaps developing in the downstream portion of the fluid column a pulsation in opposite phase to the residual pulsations transmitted by pulsation dampeners of conventional type. That is not, however, a significant disadvantage, both because the amplitude of any inverted phase residual pulsation is typically small; and because the degree of interaction of the two fluid streams can readily be arranged or adjusted to give substantially optimum performance.

It is emphasized that the present invention is entirely distinct in its manner of operation from previous devices that employ "interference" between the initial pulsation and an out-of-phase wave produced by a time delay conduit structure. The action of such interference devices is necessarily highly dependent upon frequency, whereas the compensating action of the present invention utilizes direct interaction of inlet and outlet streams at a common interface, and is not limited to a narrow range of frequencies.

Figure 3:
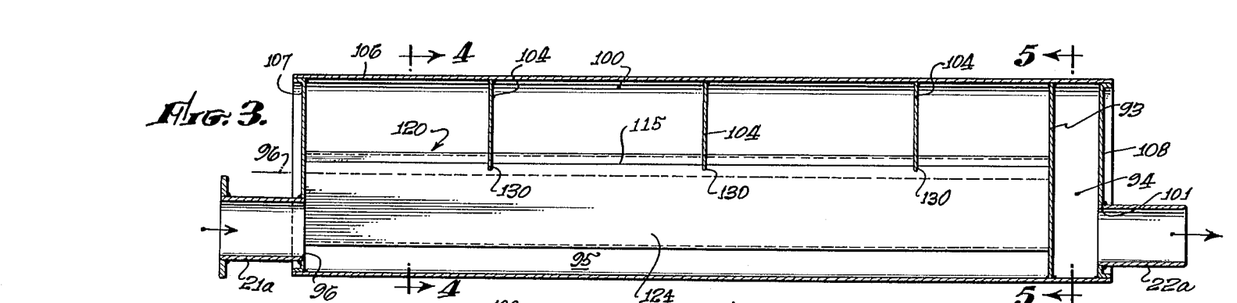
FIG. 3 is a longitudinal section representing a further illustrative embodiment of the invention.
Figure 4:
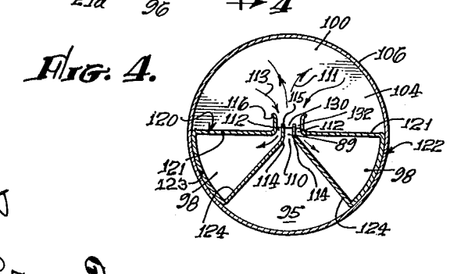
FIG. 4 is a transverse section on line 4—4 of FIG. 3.
Figure 5:
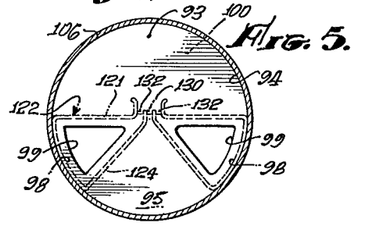
FIG. 5 is a transverse section on line 5—5 of FIG. 3.

FIGS. 3 to 5 represent a further embodiment of the invention. That embodiment, and those of FIGS. 6 and 7, to be described, are particularly adapted for damping pulsations in a column of gas, rather than liquid, and utilize that same gas as compressible medium in the damping chamber. A movable wall in the damping chamber is therefore not required. However, such a wall may be provided if desired, and the apparatus may be employed for damping pulsations in liquid columns as well as in columns of gas.

The damping structure of FIGS. 3 to 5 is adapted for connecttion in series between two portions of a fluid column, represented schematically at 21a and 22a. For illustration, gas will be considered to flow normally from column portion 21a to portion 22a; and pulsations will be considered to originate in inlet portion 21a. For example, a pumping plant may deliver natural gas to column portion 21a, and outlet 22a may communicate with a cross-country gas line; or column 21a may comprise the exhaust manifold of an internal combustion engine, and the damping structure may then act as a muffler between that source of pulsations and the tailpipe, represented at 22a.

The structure shown comprises a cylindrical housing shell 106 with cylindrical axis 96 and with its inlet and outlet ends closed by end plates 107 and 108, respectively. Within housing 106 a transverse header plate 93 close to the right-hand end, as illustrated, partially isolates the header chamber 94. The remainder of the interior of shell 106 is divided, typically by the illustrated sheet metal partitions 120 and 122 into four principal chambers or passages, which extend parallel to axis 96.

Two of those passages perform similar functions and may be considered for many purposes as parallel-connected portions of a single passage. The inlet passage 95 (FIG. 4) is in direct communication with inlet column 21a via an aperture 96 in end plate 107. The two outlet passages 98 communicate with header chamber 94 via respective apertures 99 in header plate 93 (FIG. 5), and thence with outlet column 22a via an aperture 101 in end plate 108.

The damping chamber 100 occupies the upper half of housing 106, as shown, although that orientation of the device is only illustrative. The damping chamber is preferably further divided transversely into a plurality of subchambers by baffle plates, as shown illustratively at 104. The length of the device as shown in FIG. 1 is only illustrative, and may be varied in accordance with the service for which it is intended. A single dampener may comprise, for example, a large number of subchambers of the length represented between baffles 104, or may comprise only a single such chamber.

Figure 4A:
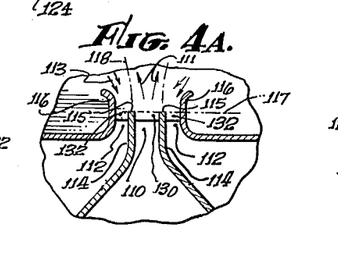
FIG. 4a is a fragmentary section corresponding to a portion of FIG. 4 at enlarged scale.

The partition structure just described is arranged to form an elongated orifice 110 of relatively narrow width which provides a path for gas flow in a direction transverse of axis 96 between inlet passage 95 and damping chamber 100; and two similarly elongated orifices 112 which are positioned closely adjacent orifice 110 on opposite sides thereof, and which communicate between damping chamber 100 and the respective outlet passages 98. The walls that define orifice 110 and the two orifices 112 preferably extend for an appreciable distance parallel to the direction of gas flow therethrough, and thus confine that flow to well-defined gas streams of laminar form. As shown in FIGS. 4 and 4A, the orifice 110 is formed by the two spaced walls 114, which also define the inner boundaries of orifices 112. Walls 114 terminate in edges 115 and thus form a nozzle in the plane 117. Inlet gas entering chamber 100 typically continues beyond plane 117 for an appreciable distance as a well-defined jet 111 of laminar form bounded by the upward projections 118 of walls 114.

The outer boundaries of orifices 112 are defined by the respective walls 116. Those walls preferably extend, as shown, in the direction of stream flow on both sides of nozzle plane 117. Moreover the outer walls 116 are preferably spaced most closely in the region adjacent or somewhat above that plane, and diverge smoothly on each side. Outlet gas is directed toward orifices 112 along definite streams 113 which are contiguous with inlet stream 111 on opposite sides thereof. All of those streams are of generally laminar form.

The invention further provides remarkably economical and convenient structures for providing chambers and passages of the described type. As shown illustratively in FIG. 4, for example, orifice walls 114 and 116 on one side of inlet stream 110 comprise the opposite longitudinal edge portions of a single partition member 120, formed typically of sheet metal. The intermediate portion of partition member 120 forms two generally radial wall portions 121 and 124 and an intermediate portion 123 which is cylindrical and fits against the interior face of housing 106. Member 120 thus encloses one of the outlet passages 98. A second partition member 122, which may be a substantial or exact duplicate of member 120, but turned end for end, encloses the other outlet passage, and its edge portions form the other pair of orifice walls 114 and 116.

The partition members 120 and 122 may be secured within shell 106 in any convenient manner. For example, they may be assembled, as by welding, with baffles 104 and header plate 93 to form a unitary partition assembly which is slidingly received within shell 106.

Baffles 104 then maintain the members 120 and 122 in the proper mutual relationship and, more particularly, anchor the orifice forming walls 114 and 116 at the desired mutual spacing at longitudinally spaced points. For that purpose baffles 104 may be slotted to form suitably dimensioned tongues 130 and 132, which fit between the orifice walls and positively locate them (FIG. 4a). Baffles 104 also limit longitudinal flow of gas within damping chamber 100, maintaining substantial balance within each longitudinal portion of the device between the flow into chamber 100 via orifice 110 and the outward flow via orifices 112. That function of the baffles becomes less important if the pressure drop along passages 95 and 98 is negligible compared to that through orifices 110 and 112; or if the pressure drops along passages 95 and 98 are equal, and if fluid connections between passages 95 and 98 and the respective portions of the fluid column are made at longitudinally adjacent points of housing 106, rather than at opposite ends as illustratively shown. Under such conditions, baffle plates 104 may be omitted, or replaced by structural members that do not block longitudinal flow in chamber 100.

The manner of action of the present embodiment, and the interaction between inlet stream 111 and outlet streams 113, are generally similar to the operation already described for the previous embodiment, and do not require detailed description. As in the previous embodiment, net fluid flow in the dampener of FIGS. 3–5 may take place in either direction.

Figure 6:
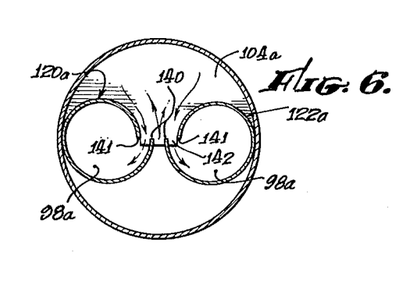
FIG. 6 is a transverse section corresponding to FIG. 4 and illustrating a modification.

The modification represented in FIG. 6 is generally similar to the modification of FIGS. 3 to 5, and operates similarly. The outlet chambers 98a in FIG. 6 are formed by respective partition members 120a and 122a, which are approximately circularly cylindrical in form. Each of those members may be formed from a circular tube, for example, which is slit longitudinally to form two longitudinal edges 140 and 141, the tube being then deformed to separate those edges in a generally radial direction. The edges may also be mutually shifted circumferentially to provide any desired degree of positive or negative overlap, but are shown illustratively with substantially zero overlap.

Baffle plates 104a are preferably provided in the damping chamber, as already described for chamber 100 of the previous embodiment. Plates 104a are preferably fixedly mounted, as by welding, with respect to partition members 120a and 122a, thus maintaining the latter in proper mutual relation and maintaining the desired relative positions of the edges 140 and 141 of each member. The latter function may be aided by providing a tongue 142 which spaces the edges 141 and which is slotted to receive the edges 140.

The structure of FIG. 6 provides a remarkably convenient, rugged and economical manner of producing desirable venturi flow at the portions of the inlet and outlet streams that are in direct mutual contact. The substantially circular form of members 120a and 122a in FIG. 6 may be varied as may be desired to modify the detailed nature of the two stream paths.

Figure 7:
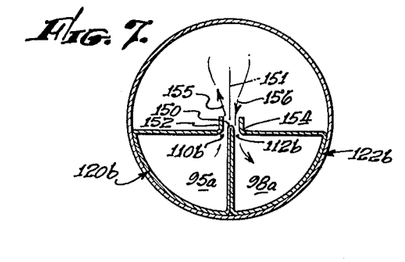
FIG. 7 is a transverse section corresponding to FIG. 4 and illustrating a further modification.

FIG. 7 represents a further modification, in which a single inlet passage 95a and a single outlet passage 98a are formed by respective partition structures 120b and 122b. Those partition structures may, for example, be formed as an integral unit from sheet metal which is bent sharply to form the edge 150. A single inlet orifice 110b and a single outlet orifice 112b are formed between the spaced parallel walls 152 and 154, which may comprise opposite edge portions of the partition member. The edge 150 forms a tongue between those walls, which, with its upward projection 151, divides the space between walls 152 and 154 into two orifices in immediately adjacent side by side relation. The inlet stream 155 and outlet stream 156 thus have only a single interface, represented at 151, rather than two interfaces as at 113 of FIG. 4a, for example. That simplicity of form does not alter the basic manner of operation of the device, which has already been described.

An important advantage of the embodiments of FIGS. 3 to 7 is the fact that when the pulsation dampener is used with a fluid column under high pressure only the outer housing is required to support that pressure. The partition and orifice structure is subjected to relatively small pressure differences, corresponding, for example, to the pressure amplitude of the pulsations to be damped rather than to the total pressure of the fluid.

Those embodiments are particularly suitable for damping pulsations in gas columns, but may be used also for liquid columns by filling the upper portion of the damping chamber with a compressible medium, either in direct contact with the liquid or separated by a flexible wall of any suitable type.

Figure 8:
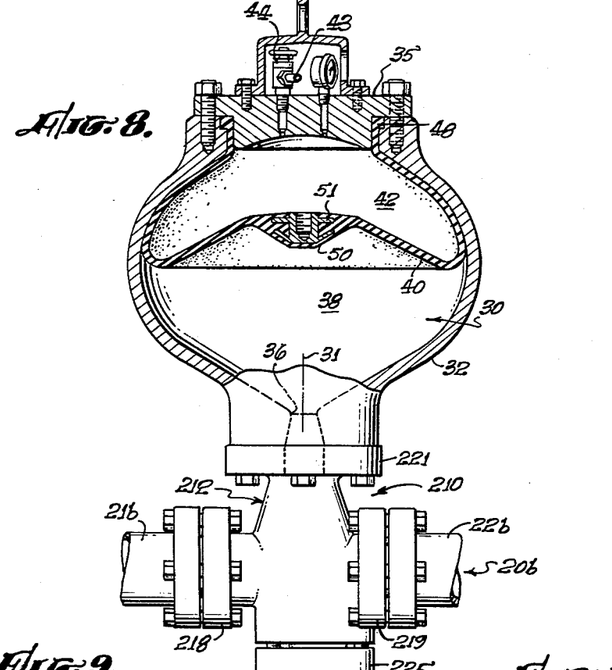
FIG. 8 is an elevation partly in section, illustrating a further embodiment.
Figure 9:
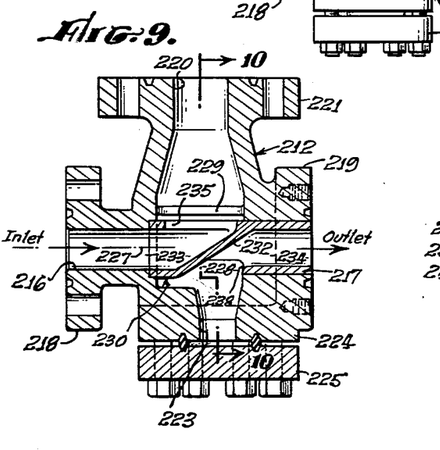
FIG. 9 is an axial section in that same aspect as FIG. 8.
Figure 10:
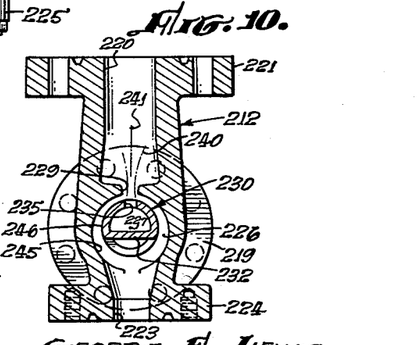
FIG. 10 is a section on line 10—10 of FIG. 9.

FIGS. 8 to 10 represent a further form of pulsation dampener, which is particularly suitable for dampening pulsations in columns of rapidly flowing liquid. The dampener is connected in series between upstream and downstream portions 21b and 22b, respectively, of a main supply pipe 20b. The dampener includes the conduit and orifice structure, indicated generally at 210, and a damping chamber. The latter is shown illustratively at 30 in the same form as chamber 30 of FIG. 1, already described.

Conduit and orifice structure 210 comprises a housing member 212, typically formed as a casting with aligned passage openings 216 and 217, shown at the left and right, respectively, provided with conventional flanges 218 and 219 for connection to the two sides of the fluid column. Housing member 212 is also provided with a lateral passage opening 220 and connecting flange 221, adapted for connection to the base of damping chamber 30. When so connected, as shown in FIG. 8, passage 220 opens coaxially into chamber 30 via its smoothly flaring mouth 36. Passages 216 and 217 communicate coaxially with each other via the enlarged, generally cylindrical central chamber of the fitting, indicated at 228, with cylindrical axis 227. Lateral passage 220 communicates with that chamber via the restricted slit-like orifice 229 which is parallel to axis 227. As illustratively shown, passage 216 provides the inlet for the fluid stream, and passage 217 provides the outlet. However, effective damping action can also be obtained with the opposite direction of flow. An alternative outlet connection is shown at 223 with connecting flange 224. When passage 217 is used as outlet, as in the unit illustrated, passage 223 is typically closed by a cover plate 225.

Within housing member 212 is mounted a tubular fitting 230 coaxial with passages 216 and 217. Fitting 230 extends across the chamber 228, the cylindrical wall of the fitting spacedly opposing the chamber wall 245 and forming with that wall a generally annular chamber indicated at 226 in FIG. 10. Fitting 230 is preferably fixed in position, as by a press fit, but may be retained only by the connected flange of fluid column 22b and a suitable key formation, not shown, for defining its rotational position. In either case the fitting is preferably removable for servicing or replacement. The structure may be designed for insertion of fitting 230 from the inlet end of the housing, particularly when the outlet is to be downward via passage 223 and passage 217 is omitted. The arrangement illustrated has the advantage that the housing neck adjacent flange 218 retains full mechanical strength, which is useful when the entire housing and damping chamber are to be mounted via flange 218 on the pump outlet, for example.

The interior of fitting 230 is divided into two chambers 233 and 234 by an oblique wall 232. Chamber 233 at the left opens to inlet passage 216, and also communicates with annular chamber 226 via the restricted slit-like orifice 235 in the cylindrical wall of the fitting. That orifice is parallel to axis 227 and is directly opposite orifice 229, forming with the latter a fluid path between chamber 233 of the fitting and passage 220 which leads to the damping chamber. Right-hand chamber 234 of the fitting essentially coincides with outlet passage 217, and is also provided with a large opening 238 that communicates freely with annular chamber 226. Opening 238 also provides a fluid connection between the two alternative outlet passages 217 and 223.

As may be seen most clearly from FIG. 10, the two orifices 229 and 235 are located in axial alignment with respect to the axial plane 241. They are formed in respective spacedly opposed walls, one of which is the generally cylindrical wall 245 of chamber 228 and the other is the generally cylindrical wall 246 of fitting 230. The slit widths are both small relative to the radii of cylindrical curvature of the walls in which they are formed. Hence in many respects the flow through the orifices is the same as if the walls were flat. However, the cylindrical axes of those two walls are preferably slightly offset in a direction to make the spacing between the walls a minimum in the vicinity of the orifices, as shown clearly in FIG. 10. That arrangement permits a relatively narrow spacing between the walls adjacent the orifices, while facilitating free mass flow of fluid around the fitting from orifice 229 to outlet passage 217. In particular, the described structure provides in chamber 226 a smooth increase in sectional area from the neighborhood of the orifices outward, conserving head pressure.

In operation of the embodiment of FIGS. 8 to 10 with the connections shown, the main stream of fluid entering through inlet passage 216 is directed by oblique wall 232 through orifice 235. It is formed thereby into a directed stream of laminar form which extends upward from orifice 235 and through the central portion of orifice 229. The boundaries of such a stream are indicated by dashed lines at 240, and its axial plane is indicated at 241. The stream width decreases somewhat after leaving defining orifice 235, typically reaching a minimum width that is approximately seventy percent of the orifice width. That minimum typically occurs close to orifice 229. The orifice dimensions are so designed that the stream 240 occupies approximately half of the area of orifice 229, as more fully discussed below. The remaining area of the latter orifice, amounting preferably to approximately one half of its total area, is thus available for flow in the opposite direction, from damping chamber 30 to outlet passage 217. That reverse flow passes downward through orifice 229 on each side of the upward stream in symmetrical relation to axial plane 241. It does not pass through orifice 235, turning off instead through the two branches of annular chamber 226 to the outlet.

The interaction at surfaces 240 of the two streams passing toward and from damping chamber 30 provides enhanced damping action of the type already described. That is true despite the fact that in the present embodiment the upward stream is defined entirely by orifice structure 235 that does not extend inside the larger orifice 229. The discovery that the two orifices may be mutually spaced longitudinally of the common axis of the interacting streams permits the construction of simpler and more economical mechanism, and also facilitates providing effective damping action while accommodating relatively large mass flows without appreciable restriction of the flow.

For that purpose the parts are preferably so dimensioned that the streams to and from the damping chamber encounter negligible restriction except as the described orifices 229 and 235; but effective damping action does not require that the restriction even at those orifices be sufficient to cause appreciable loss of head pressure. Stream defining orifice 235 typically has a transverse sectional area of the order of one quarter the sectional area of the main delivery pipe 20b, values about one half to about one eighth ordinarily giving satisfactory results. The velocity of the resulting stream at 240 is then of the order of four times the pipe velocity, which provides effective damping action of the present type without significantly restricting the flow. Orifice 229, within which a large fraction of the interaction takes place between the two opposing streams, preferably has a transverse sectional area approximately twice that of orifice 235. In practice satisfactory results are ordinarily obtainable when the sectional area of orifice 229 has a value between about ½ and about 3 times that of orifice 235. The two stream velocities are then within a factor of about two of equality, neglecting the jet contraction already mentioned. The two oppositely moving streams may then be referred to as having approximately equal absolute velocities, providing maximum damping effectiveness for a given overall degree of flow restriction.

The spacing between opposed walls 245 and 246 adjacent orifice 229 is preferably substantially equal to the width of each of the downward fluid streams through that orifice, which is typically one quarter of the total orifice width. There is then no abrupt change of stream velocity, which would entail energy loss.

Figure 11:
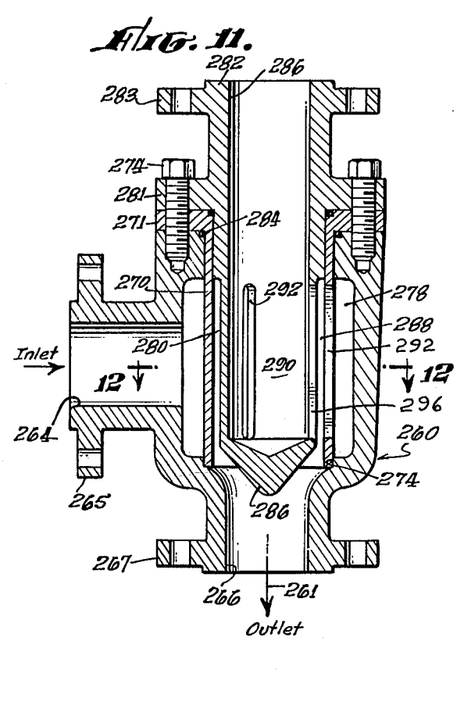
FIG. 11 is an axial section illustrating a modification.
Figure 12:
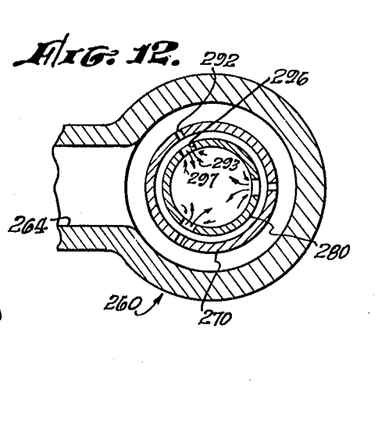
FIG. 12 is a horizontal section on line 12—12 of FIG. 11.

FIGS. 11 and 12 represent an alternative manner of arranging and constructing a device having functional characteristics similar to those of FIGS. 8 to 10. The housing member 260 defines a generally cylindrical chamber with vertical axis 261. A horizontal inlet passage 264 and a vertical downwardly extending outlet passage 266 communicate with the housing chamber. Connection flanges 265 and 267 are indicated for connecting the upstream and downstream portions of the fluid delivery pipe in which pulsations are to be dampened. Two coaxially related outer and inner sleeves 270 and 280 of different diameter are fixedly mounted coaxially of the housing chamber. In the present embodiment mounting flanges 271 and 281 for those sleeves are provided at their upper ends and are bolted directly to the housing member by bolts 274. Suitable provision is made for packing elements, such as O-rings, as indicated at 284, to render the joints fluid-tight. Inner sleeve 280 has an upward extension 282, which carries a mounting flange 283 for connection to the damping chamber, and which provides a passage 286 communicating therewith. The damping chamber may be of the type illustrated in FIG. 8 and already described. The lower end of outer sleeve 270 is received by a fitting groove at 274 in the housing, forming a joint that is effectively fluid-tight against the relatively low pressures that can exist across it. The lower end of inner sleeve 280 is closed by a formation 286 that is preferably stream-lined with respect to flow along axis 261.

That described sleeve structure defines an outer annular chamber 278 between the housing wall and sleeve 270; an inner annular chamber 288 between the two sleeves; and a central cylindrical chamber 290 within the inner sleeve. As thus far described, outer chamber 278 communicates only with inlet passage 264; inner annular chamber 288 only with outlet passage 266; and central chamber 290 only with the damping chamber via passage 286. As in previously described embodiments, useful damping is also obtainable by exchanging the described inlet and outlet connections, in which the fluid flow to be described is reversed.

A plurality of sets of aligned orifices is provided in the mutually spaced opposed walls formed by sleeves 270 and 280. The orifices in outer sleeve 270 are indicated at 292, and are circumferentially distributed at uniform angular intervals. They comprise relatively long slits parallel to axis 261. Aligned radially with them are the corresponding orifices 296 in inner sleeve 280. The latter orifices are also of slit form and are substantially the same length as orifices 292, but are approximately twice as wide as the latter, as is shown best in FIG. 12.

With the described arrangement, outer orifices 292 define respective streams of fluid which flow radially inward from outer annular chamber 278 under the pressure head from inlet passage 264. Those streams, which are represented schematically at 293 in FIG. 12, extend inward from orifices 292 across the relatively narrow annular chamber 288 and through the central portions of the respective inner orifices 296 into central chamber 290. From there the fluid has free access via passage 286 to damping chamber 30 (FIG. 8). Outgoing fluid from chamber 290 flows radially outward through the edge portions of the orifices 296 into inner annular chamber 288, from which the fluid has free access via passage 266 to the downstream portion of the main pipe. The outgoing streams through orifices 296 are indicated schematically at 297. Those streams are directly contiguous to the incoming streams 293, and interact with them in the manner already described to produce enhanced dampening of any pulsations.

It will be understood that the number and detailed arrangement of the sets of aligned orifices in the spacedly opposed walls 270 and 280 may be varied widely without departing from the proper scope of the invention. The considerations already described as to preferred orifice dimensions and spacing between the orifice-containing walls in the previously described embodiments apply to the present embodiment. If desired, the damping chamber may be connected to passage 264 of FIGS. 11 and 12, rather than to passage 286. The relative sizes of the orifices in the larger and smaller walls 270 and 280 are then interchanged. Passages 266 and 286 are then utilized one for inlet and one for outlet. With that arrangement it is preferred that passage 286 be the inlet and 266 the outlet, though the opposite connection is also useful.

Figures 13, 14, 15:
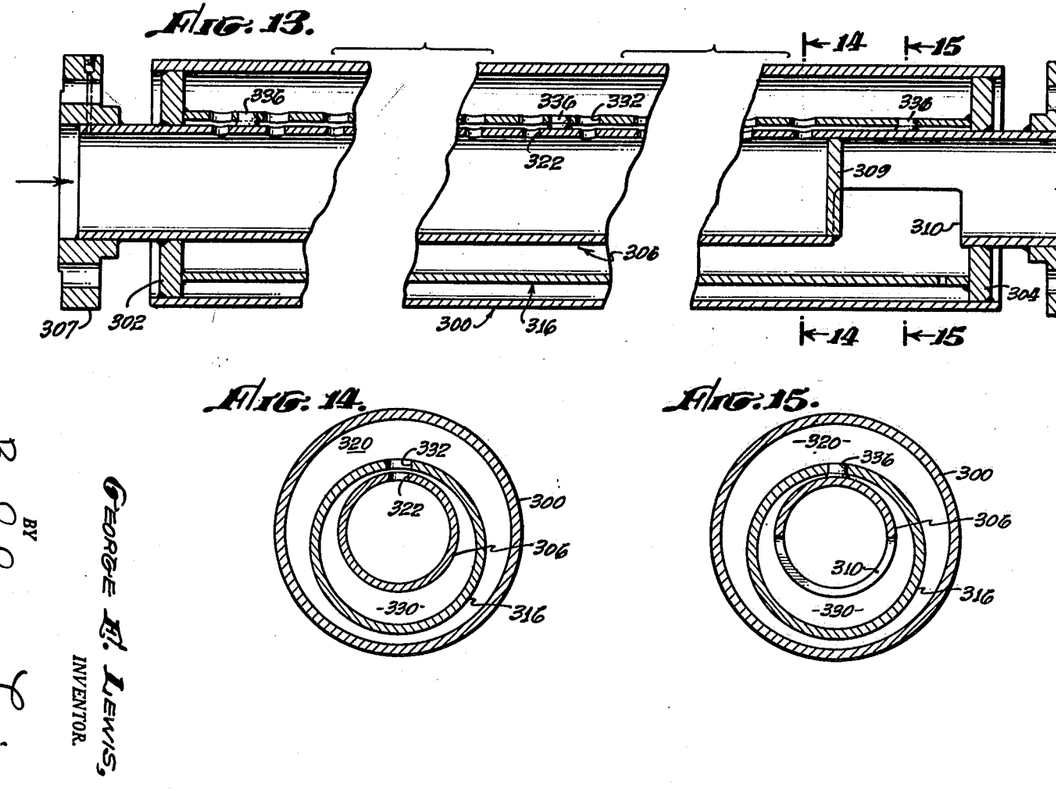
FIG. 13 is an axial section illustrating a further embodiment.
FIG. 14 is a section on line 14—14 of FIG. 13.
FIG. 15 is a section on line 15—15 of FIG. 13.

FIGS. 13 to 15 represent an axially elongated damping structure that is particularly well adapted for eliminating pulsations in a high pressure gas line. The outer cylindrical housing 300 has its ends closed by the end plates 302 and 304. Those plates are centrally apertured to receive the inner tube 306 which extends continuously through the housing. Suitable fittings, shown as the flanges 307 and 308 are mounted on the tube ends for connection to a fluid delivery line. Tube 306 is blocked by the stop 309 at a point spaced inwardly from end plate 304, and an aperture 310 is provided in the tube wall between that stop and the end plate.

A second tube 316 of larger diameter than tube 306 extends continuously between the end plates 302 and 304, to which it is fixedly welded. Whereas the inner tube is typically coaxially placed in housing 300, intermediate tube 316 is offset. Hence the chamber 320 formed between it and the housing, on the one hand, and the chamber 330 formed between it and the inner tube on the other hand, both have transverse sections of generally crescent form, as shown clearly in FIGS. 14 and 15.

An elongated array of orifices is provided in the tube walls communicating between those chambers. As illustratively shown in the present embodiment, those orifices comprise a plurality of pairs of aligned orifices in the respective tubes, the orifice pairs being distributed longitudinally of the housing at uniform intervals. Each orifice pair comprises a relatively small orifice 322 in the wall of inner tube 306 and a radially aligned and larger orifice 332 in the wall of intermediate tube 316. The area of the larger orifice is preferably approximately twice that of the smaller one, and the sum of the area of all the smaller orifices 322 is preferably approximately one fourth of the sectional area of the fluid supply pipe in which pulsations are to be damped, within the practical limits already discussed in connection with previous embodiments. Tube 306 is typically substantially equal in size to the fluid pipe. The alignment of the orifices of each pair is preferably maintained accurately by suitable reinforcing connections between tubes 306 and 316, shown illustratively as the plug welds 336 which are inserted at intervals as required between adjacent pairs of orifices. The relative spacing of the tubes adjacent the orifices is preferably substantially equal to the difference in the radii of orifices 322 and 332. The flow through orifices 332 toward chamber 330 is then acommodated by the space between the tubes without abrupt change of stream velocity. It is sometimes desirable to divide chamber 320 transversely by means of one or more fixed baffles, as indicated at 104 in FIG. 3, to prevent appreciable longitudinal flow within the chamber and insure that the opposing fluid streams at each orifice 332 are substantially equal.

I claim:
1. Pulsation dampening means comprising in combination two generally parallel spacedly opposed walls, aligned apertures in the respective walls, the aperture in one wall being larger than the aperture in the other wall and spaced therefrom, structure forming a chamber adapted to contain a compressible medium and communicating with the outer face of said one wall, first conduit means communicating with the outer face of the other wall, and second conduit means communicating with the space between the walls.

2. Pulsation dampening means as defined in claim 1, and wherein said two walls are cylindrically curved with their axes of curvature mutually parallel.

3. Pulsation dampening means as defined in claim 1, and wherein said two walls are cylindrically curved with different radii of curvature, the axes of curvature of the walls being mutually parallel and offset in such a direction that the spacing between the walls is least in the vicinity of the apertures and increases circumferentially in both directions therefrom.

4. Pulsation dampening means comprising in combination two generally cylindrical walls substantially coaxial and radially spaced, a plurality of circumferentially spaced apertures in one wall, an equal plurality of apertures in the other wall aligned with, and smaller than, respective apertures in said one wall, first conduit means communicating with the space between the opposing faces of the walls, structure forming a chamber adapted to contain a compressible medium and communicating with the other face of said one wall, and second conduit means communicating with the other face of the other wall.

5. Pulsation dampening means for connection in series between the upstream and downstream sides of a fluid delivery pipe, said pulsation dampening means comprising the combination of an elongated housing with closed ends, structure forming at least three chambers which extend longitudinally in parallel relation within the housing essentially the entire length thereof, structure forming two elongated orifices which communicate between the first and second chambers, respectively, and the third chamber, said two orifices opening into the third chamber immediately adjacent each other, and conduit means for fluid flow between the first and second chambers and the respective sides of the delivery pipe.

6. Pulsation dampening means for connection in series between the upstream and downstream sides of a fluid delivery pipe, said pulsation dampening means comprising the combination of a generally cylindrical housing with closed ends, structure forming a damping chamber and three passage chambers which extend longitudinally in parallel relation within the housing, said structure forming three elongated, axially extending orifices which communicate between the damping chamber and the respective three passage chambers, two of said orifices opening into the damping chamber immediately adjacent the third orifice and on opposite sides thereof, first conduit means for fluid flow between one side of the delivery pipe and the passage chamber associated with said third orifice, and second conduit means for fluid flow between the other side of the delivery pipe and the other two passage chambers in parallel.

7. Pulsation dampening means for connection in series between the upstream and downstream sides of a fluid delivery pipe, said pulsation dampening means comprising the combination of a generally cylindrical closed housing, a plurality of longitudinally extending partition members each of generally tubular form fixedly mounted within the housing in closely spaced transverse relation to form a wall transversely across the interior of the housing dividing the same into a damping chamber and an access chamber, said tubular partition members being closely spaced to form an elongated orifice for transversely directed fluid flow between the access chamber and the damping chamber, the partition members on each side of said orifice being provided with respective elongated partition orifices for transversely directed fluid flow between the interior of the partition member and the damping chamber, said partition orifices opening into the damping chamber immediately adjacent and on opposite sides of the first said orifice, first conduit means for conducting fluid between the access chamber and one side of the delivery pipe, and second conduit means for conducting fluid in parallel between the interiors of both the partition members and the other side of the delivery pipe.

8. Pulsation dampening means for connection in series between the upstream and downstream sides of a fluid delivery pipe, said pulsation dampening means comprising in combination structure forming a chamber containing a compressible medium, structure forming two orifices in axial alignment having respective mouths opening toward the chamber, the chamber dimensions being large compared to the transverse dimensions of the orifices, the mouth of the larger orifice communicating directly with the chamber and the mouth of the smaller orifice being axially spaced from the chamber and from the larger orifice and communicating with the chamber only through the entire axial length of the larger orifice, conduit means providing a path for one fluid stream passing through both orifices in series between the chamber and one side of the pipe, and conduit means providing a path for another fluid stream passing through only the larger orifice between the chamber and the other side of the pipe, said two streams passing in opposite directions and in directly contiguous relation through the entire axial length of the larger orifice, both orifices being of sufficient size to permit substantially unrestricted mass flow through said pulsation dampening means, and the two streams interacting throughout the axial length of the larger orifice to substantially prevent transmission of pulsations between the two sides of the pipe.

9. Pulsation dampening means as defined in claim 8, and wherein said orifices are formed in respective mutually spacedly opposed walls.

10. Pulsation dampening means as defined in claim 8, and wherein said orifices comprise slits formed in respective mutually spacedly opposed walls which are cylindrically curved, the cylindrical axes of the walls being parallel to each other and to the length of the slits.

11. Pulsation dampening means for connection in series between the upstream and downstream sides of a fluid delivery pipe, said pulsation dampening means comprising in combination an elongated housing, structure dividing the interior of the housing into two access chamber means and a damping chamber means, each of said chamber means extending essentially the entire length of the housing in parallel relation, conduit means for connecting the access chamber means to the respective sides of the pipe, the damping chamber means being adapted to contain a compressible medium, said structure forming two orifice means which are mutually aligned and are directed transversely with respect to the housing and extend longitudinally of the housing essentially the entire length of the chamber means, one of said orifice means providing a directed fluid path for the entire flow of the delivery pipe between the damping chamber means and one of the access chamber means, the other orifice means providing a directed fluid path for essentially the entire flow of the delivery pipe between the damping chamber means and the other access chamber means, the flow path directed by one of said orifice means passing through at least a portion of the axial length of the other orifice means in opposition to the other flow path and in directly contiguous relation therewith.

12. Pulsation dampening means as defined in claim 11, and wherein said structure comprises two spacedly opposed walls in which the respective orifice means are formed, one wall separating the two access chamber means, and the other wall separating the damping chamber means from one of the access chamber means.

References Cited by the Examiner
UNITED STATES PATENTS

| | | | |
|---|---|---|---|
| 681,391 | 8/01 | Fenner | 181—59 |
| 784,833 | 3/05 | Brush | 181—59 |
| 1,583,908 | 5/26 | Williams | 181—53 |
| 1,622,843 | 3/27 | Price et al. | 138—26 XR |
| 2,056,608 | 10/36 | Jack | 181—59 |
| 2,757,689 | 8/56 | Knox | 138—30 |
| 2,893,432 | 7/59 | Gibson | 138—26 |

LEWIS J. LENNY, *Examiner.*

EDWARD V. BENHAM, *Primary Examiner.*